(12) United States Patent
Hattass et al.

(10) Patent No.: US 12,123,954 B2
(45) Date of Patent: Oct. 22, 2024

(54) LIDAR SYSTEM

(71) Applicant: Robert Bosch GmbH, Stuttgart (DE)

(72) Inventors: Mirko Hattass, Stuttgart (DE); Alf Neustadt, Stuttgart (DE); Nico Heussner, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 955 days.

(21) Appl. No.: 17/148,247

(22) Filed: Jan. 13, 2021

(65) Prior Publication Data

US 2021/0215828 A1 Jul. 15, 2021

(30) Foreign Application Priority Data

Jan. 14, 2020 (DE) .......................... 102020200348.3

(51) Int. Cl.
G01S 17/931 (2020.01)
G01S 7/481 (2006.01)
G01S 7/484 (2006.01)
G01S 7/486 (2020.01)

(52) U.S. Cl.
CPC .......... G01S 17/931 (2020.01); G01S 7/4817 (2013.01); G01S 7/484 (2013.01); G01S 7/486 (2013.01)

(58) Field of Classification Search
CPC .............................. G01S 7/484; G01S 17/931
See application file for complete search history.

(56) References Cited

U.S. PATENT DOCUMENTS

| 2009/0262415 A1* | 10/2009 | Cottingame | G01S 7/484 359/341.1 |
| 2019/0227175 A1 | 7/2019 | Steinberg et al. | |
| 2019/0306428 A1* | 10/2019 | Vilan | H04N 23/687 |
| 2020/0166612 A1* | 5/2020 | Dutton | G01S 17/10 |

FOREIGN PATENT DOCUMENTS

WO 2018031266 A1 2/2018

* cited by examiner

Primary Examiner — Yuqing Xiao
Assistant Examiner — Clara G Chilton
(74) Attorney, Agent, or Firm — NORTON ROSE FULBRIGHT US LLP; Gerard A. Messina

(57) ABSTRACT

A LIDAR system including a light source for emitting a light pulse along an optical axis, a deflection device to deflect in an oscillating manner the light pulse along the optical axis in first and second spatial directions so that the light pulse along the optical axis repeatedly runs through a two-dimensional scan pattern, and a control unit for activating and deactivating the light source. The oscillating deflection in the first spatial direction is achieved by repeated first partial movements and second partial movements. The oscillating deflection in the second spatial direction is achieved by repeated third partial movements and fourth partial movements. The control unit activates the light source to emit a light pulse at predefined locations of the scan pattern, and activates the light source to emit a light pulse at different pixels during the first partial movements and/or third partial movements than during the second partial movements and/or fourth partial movements.

15 Claims, 5 Drawing Sheets

LIDAR SYSTEM

CROSS REFERENCE

The present application claims the benefit under 35 U.S.C. § 119 of German Patent Application No. DE 102020200348.3 filed on Jan. 14, 2020, which is expressly incorporated herein by reference in its entirety.

FIELD

The present invention relates to a LIDAR system. In particular, the present invention relates to a vehicle that includes this type of LIDAR system.

BACKGROUND INFORMATION

LIDAR systems for distance measurement are available in the related art. An essential core of such a LIDAR system is a light source, for example a laser light source, that emits a temporally structured light signal. This light signal is reflected at objects and detected by a receiving unit. The receipt of the reflected signal allows the ascertainment of the distance of the object, at which the reflection has taken place, from the LIDAR system, for example based on the signal propagation time. LIDAR systems may carry out one-dimensional measurements; i.e., the stated light pulse is emitted at only a single location. Two-dimensional measurements, in which the light pulse illuminates various areas of a two-dimensional measuring surface, are likewise possible. In any case, requirements concerning eye safety must be met. This means that only a predefined maximum quantity of light may enter the human eye. This is relevant in particular for laser devices in order to avoid eye damage from excessively high light energy.

SUMMARY

A LIDAR system according to an example embodiment of the present invention is designed as a system that measures in two dimensions. It is provided that a scan pattern is achieved which, on the one hand, covers a preferably large measuring surface, and, on the other hand, meets requirements for eye safety. In particular, the stated LIDAR system may emit high-energy light pulses, but at the same time there is no risk of eye damage. This is achieved in that various pixels of the scan pattern are illuminated at different points in time.

The LIDAR system according to an example embodiment of the present invention includes at least one light source for emitting a light pulse. The light pulse is emitted along an optical axis of the LIDAR system. The the light pulse along the optical axis is deflectable by a deflection device of the LIDAR system. The deflection device is designed to deflect the light pulse along the optical axis in at least one first spatial direction and one second spatial direction. The spatial directions are preferably oriented independently of one another, i.e., in particular perpendicularly, but at least not oriented in parallel. The two-dimensional scanning may be achieved in this way, since every point in a two-dimensional measuring surface may be illuminated by the deflection device, the stated measuring surface being spanned by the two spatial directions. Lastly, the LIDAR system includes a control unit. The control unit is used for activating and deactivating the light source, so that the light source may be activated to emit the light pulse with the aid of the control unit.

The deflection device is designed to deflect in an oscillating manner the light pulse along the optical axis in the first spatial direction and also in the second spatial direction. This means that the light pulse along the optical axis passes through a two-dimensional scan pattern. The scan pattern is designed in particular in such a way that all areas of the measuring surface are covered in a sinusoidal shape or zig-zag shape.

The oscillating deflection of the light pulse along the optical axis in the first spatial direction is achieved by repeated first partial movements as well as second partial movements opposite from the first partial movements. The first partial movements and second partial movements differ in particular solely in the movement direction, but not in the deflection extent. Likewise, the oscillating deflection of the light pulse along the optical axis in the second spatial direction is achieved by repeated third partial movements as well as fourth partial movements 8 opposite the third partial movements. Once again, in particular there is a difference between the third partial movement and the fourth partial movement solely in the direction, but not in the deflection extent.

The control unit is designed to activate the light source to emit a light pulse in each case at predefined locations of the scan pattern. The predefined locations of the scan pattern are also referred to below as pixels. In particular, the pixels are predefined in such a way that an entire measuring surface to be examined is covered by the pixels. The control unit may thus detect the entire measuring surface, in that a light pulse is emitted at the corresponding predefined locations of the scan pattern. The light pulses at the pixels are selected in particular in such a way that they meet the requirements for eye safety, and exposure to the eye is reduced as best as possible.

The control unit is designed in such a way that the light source is to be activated to emit a light pulse at different pixels during the first partial movements and/or third partial movements than during the second partial movements and/or fourth partial movements. A temporal distance between the emission of light pulses at the first pixels and the emission of light pulses at the second pixels is thus achieved. All pixels of the measuring surface may particularly preferably be illuminated by this manner of actuating the light source, the stated illumination taking place with an increased temporal distance and spatial distance, in particular with a maximum temporal and spatial distance.

Preferred refinements of the present invention are disclosed herein.

In accordance with an example embodiment of the present invention, the deflection device is preferably designed to deflect the light pulse along the optical axis along the scan pattern in a forward movement and a backward movement, the forward movement and the backward movement being oppositely oriented. The scan pattern during the forward movement is thus identical to the scan pattern during the backward movement. In other words, a single scan pattern is present that is run through during the forward movement as well as during the backward movement, so that the movements are identical but the directions are different. The forward movement is a superimposition of multiple first partial movements and second partial movements with a single third partial movement. The forward movement is thus designed in particular as a sinusoidal shape or zig-zag shape. The backward movement is a superimposition of multiple first partial movements and second partial movements with a single fourth partial movement. In accordance with an example embodiment of th present invention, the control unit is preferably additionally designed in such a way that during the forward movement a light pulse is emitted only at first pixels. This means that the control unit is designed to activate the light source in such a way that during the forward movement it emits the light pulse only at the stated first pixels. In contrast, no light pulse is emitted at second pixels, so that during the forward movement, the control unit is designed to skip over the second pixels during the emission of light pulses. In contrast, a reverse activation takes place during the backward movement. The control unit is thus designed, during the backward movement, to activate the light source to emit a light pulse at the second pixels. In this case, the first pixels are skipped over, so that no light pulse is emitted at the first pixels. It is particularly advantageous that the totality of the first pixels and the second pixels form the entire measuring surface. Thus, during the first partial movement and the second partial movement it is particularly advantageous that only every other second swept pixel is always illuminated in the first spatial direction. In order for all pixels to still be illuminated, a change of the illuminated pixels takes place during the change from the third partial movement in the second spatial direction to the fourth partial movement in the second spatial direction. In this way, during the forward movement only the first pixels are illuminated, and during the backward movement only the second pixels are illuminated.

The first pixels and the second pixels are spatially situated preferably directly adjacent to one another. In particular, this means that the first pixels and the second pixels are advantageously situated directly adjacent to one another along the scan pattern. Adjacent pixels are thus illuminated at different points in time, in particular the greatest possible distance between the points in time of the illumination of the adjacent pixels being present. This results in a significant reduction in exposure to the eyes, so that eye damage is avoided.

In addition, the control unit is preferably designed to activate the light source to emit a light pulse only at a first group of pixels during the first partial movements and/or third partial movements. In contrast, during the second partial movements and/or fourth partial movements, the control unit activates the light source to emit a light pulse only at a second group of pixels. The pixels of the first group and the pixels of the second group are offset relative to one another, in particular situated directly adjacent to one another. Due to such an activation, in particular all pixels that are swept by these movements are illuminated after a combined first partial movement and second partial movement, or a combined third partial movement and fourth partial movement, is carried out, a temporal and spatial offset of the illumination taking place. In particular, adjacent pixels are not illuminated in direct succession, but instead, during the initial partial movement only an illumination of some pixels, in particular every second pixel, takes place. The pixels that were skipped over are illuminated during the subsequent opposite partial movement. As a result, the time intervals may be extended between the light pulses, thus reducing the power that briefly reaches the eye.

It is preferably provided that the light source includes a first subunit and a second subunit. The first subunit and the second subunit are preferably actuatable independently of one another by the control unit. In addition, it is preferably provided that the first subunit and the second subunit carry out an illumination via the same deflection device; this means that the optical axes of the first subunit and of the second subunit are deflectable by the same deflection device. The first subunit and the second subunit are thus preferably designed to illuminate two pixels independently of one another. In particular, two adjacent pixels may thus be illuminated independently of one another. Thus, in particular during the various partial movements along the scan pattern, a group of two pixels may always be illuminated simultaneously. As a result, fewer oscillating movements are necessary in the first spatial direction and the second spatial direction in order to completely cover a predefined measuring surface. Less stringent requirements are thus to be imposed on the dynamics of the deflection device.

The illumination by the first subunit and the second subunit particularly preferably takes place during different movements of the optical axes. This means that the control unit is designed to activate the first subunit to emit light pulses only during the first partial movements and/or the third partial movements. In addition, the control unit is designed to activate the second subunit to emit light pulses only during the second partial movements and/or fourth partial movements. A further temporal and spatial separation of the illumination of the pixels thus takes place.

In accordance with an example embodiment of the present invention, the deflection device is advantageously designed as a micromirror actuator. The micromirror actuator allows a deflection due to tilting of the mirror surface. The deflection of the light pulse along the optical axis of the light source may thus be achieved. In particular, micromirror actuators may also be easily activated with little effort, in particular high dynamics being achievable when actuating the stated micromirror actuators.

In a further advantageous embodiment of the present invention, it is provided that the deflection device is designed as an individual mirror that is tiltable about two different axes. A deflection in the first spatial direction as well as a deflection in the second spatial direction may thus be achieved with the aid of the individual mirror.

In one alternative embodiment of the present invention, it is provided that the deflection device includes a first mirror and a second mirror. The light pulse along the optical axis is deflectable in the first spatial direction via the first mirror, while the light pulse along the optical axis is deflectable in the second spatial direction via the second mirror. In particular, the first mirror and the second mirror are situated in succession, so that the light pulse emitted by the light source initially strikes the first mirror and subsequently the second mirror, or alternatively, initially strikes the second mirror and then the first mirror. Once again, a deflection of the light pulse along the optical axis in both spatial directions may thus take place.

The light source is advantageously a laser light source. The light pulses are therefore laser pulses. Effective and reliable measuring of distances is thus made possible.

All pixels are advantageously situated directly adjacent to one another. As a result, all pixels form a continuous two-dimensional measuring surface. This measuring surface may thus be illuminated by the light pulses of the light source.

Moreover, the present invention relates to a vehicle. The vehicle includes a LIDAR system as described above. It is thus possible for the vehicle in particular to determine distances from objects in the surroundings. It is particularly advantageously possible for the vehicle to ascertain the distance from objects in the travel direction ahead of the vehicle, in particular to recognize preceding traffic.

Preferred refinements of the present invention are disclosed herein.

BRIEF DESCRIPTION OF THE DRAWINGS

Exemplary embodiments of the present invention are described in greater detail below with reference to the figures.

DETAILED DESCRIPTION OF EXAMPLE EMBODIMENTS

Figure 1:
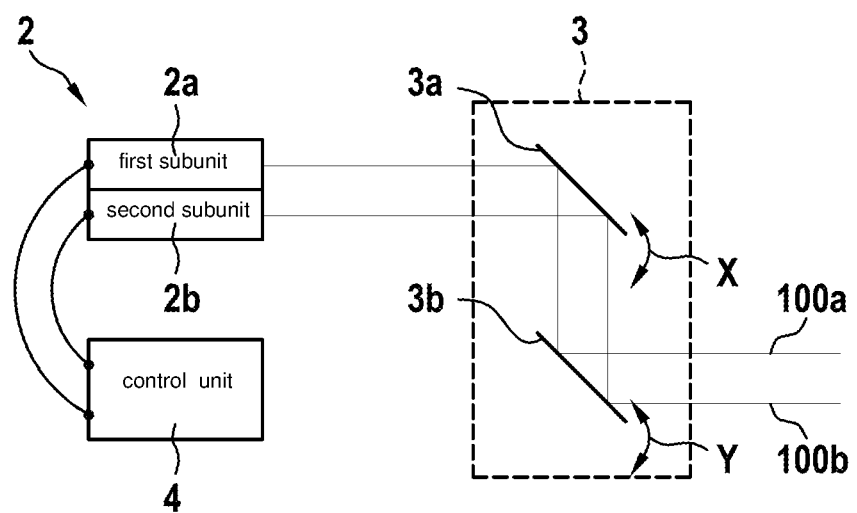
FIG. 1 shows a schematic illustration of the LIDAR system according to one exemplary embodiment of the present invention.

FIG. 1 schematically shows a LIDAR system 1 according to one exemplary embodiment of the present invention. LIDAR system 1 includes a light source 2, a deflection device 3, and a control unit 4. Light source 2 is used for emitting light along an optical axis 100. In the exemplary embodiment shown, light source 2 includes a first subunit 2a and a second subunit 2b, first subunit 2a emitting light pulses along a first optical axis 100a. Second subunit 2b emits light pulses along a second optical axis 100b. In one alternative embodiment, it is also possible for only one light source 2 to be present which emits a single light pulse along a single optical axis 100. Using two subunits 2a, 2b makes it possible to illuminate two adjacent locations independently of one another, a single deflection device 3 being used for this purpose. Since the deflections of first optical axis 100a and of second optical axis 100b are thus coupled and therefore relatively unchangeable relative to one another, for describing the deflections, only optical axis 100 is referenced in order to cover cases in which only one pixel 12, 13 may be illuminated by light source 2 and in which two pixels 12, 13 may be illuminated by light source 2.

Deflection device 3 is used to deflect optical axis 100 or optical axes 100a, 100b in a first spatial direction X and also in a second spatial direction Y. Spatial directions X, Y are oriented perpendicularly to one another, and correspond in particular to coordinate axes in a Cartesian coordinate system.

Figure 2:
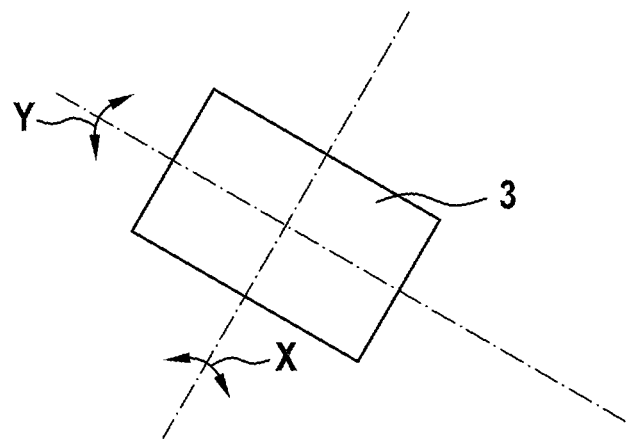
FIG. 2 shows a schematic illustration of an alternative deflection device of the LIDAR system according to an exemplary embodiment of the present invention.

FIG. 1 schematically shows that deflection device 3 includes a first mirror 3a and a second mirror 3b. First mirror 3a allows a deflection in first spatial direction X, while second mirror 3b allows a deflection in second spatial direction Y. As an alternative, a mirror element illustrated by way of example in FIG. 2 may be used, in which deflection device 3 is designed as an individual mirror that is tiltable about two different axes. A change in first spatial direction X and in second spatial direction Y may take place in this way.

Figure 3:
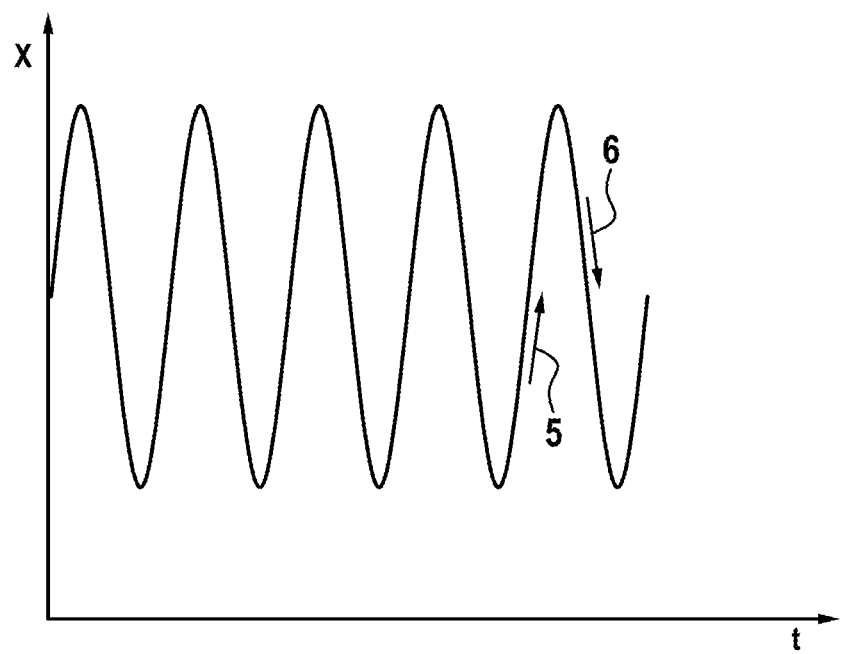
FIG. 3 shows a schematic view of a time curve of the deflection in a first spatial direction.
Figure 4:
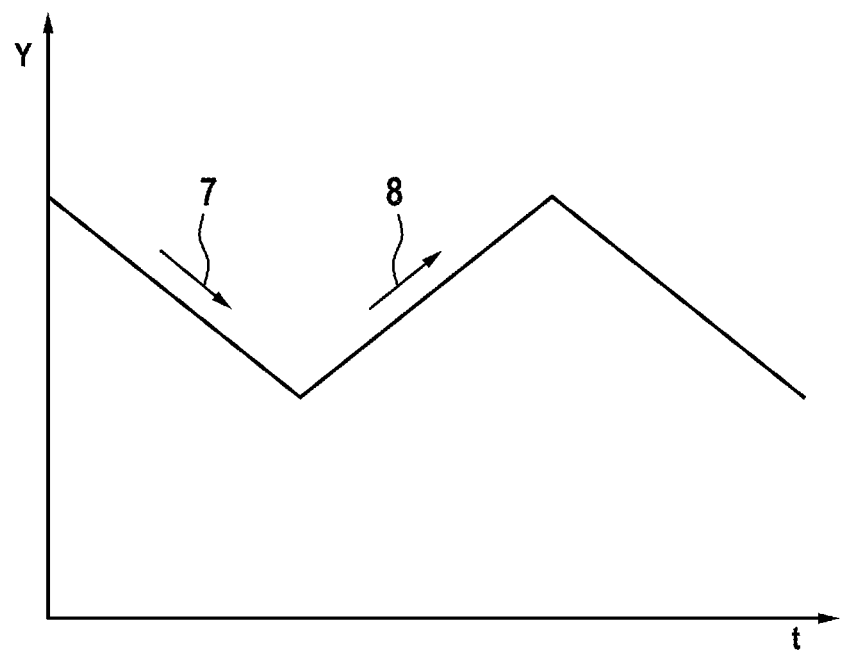
FIG. 4 shows a schematic view of a time curve of a deflection in the second spatial direction.

Deflection device 3 allows a deflection movement of optical axis 100 to be implemented by appropriate activation of the mirrors that are used. For this purpose, in particular such activation patterns are used so that the light pulse along the optical axis is deflected in an oscillating manner in first spatial direction X as well as in second spatial direction Y. Corresponding activation patterns are shown in FIGS. 3 and 4. Thus, FIG. 3 schematically shows the pattern of the deflection in first spatial direction X as a function of time t. In particular a sinusoidal deflection is provided here. A sawtooth pattern as a function of time is preferably present in second spatial direction Y, as schematically illustrated in FIG. 4. In each case, the deflection in first spatial direction X and second spatial direction Y is thus made up of oscillating movements. In first spatial direction X a first partial movement is present, a second partial movement 6 being subsequently carried out. First partial movement 5 and second partial movement 6 are oppositely oriented in first spatial direction X. The same applies for second spatial direction Y. Here as well, oppositely oriented partial movements are present, a plurality of third partial movements 7 and opposite fourth partial movements 8 being carried out. A scan pattern 9, schematically illustrated in FIGS. 5 through 8, is achievable by superimposing these partial movements 5, 6, 7, 8.

Figure 5:
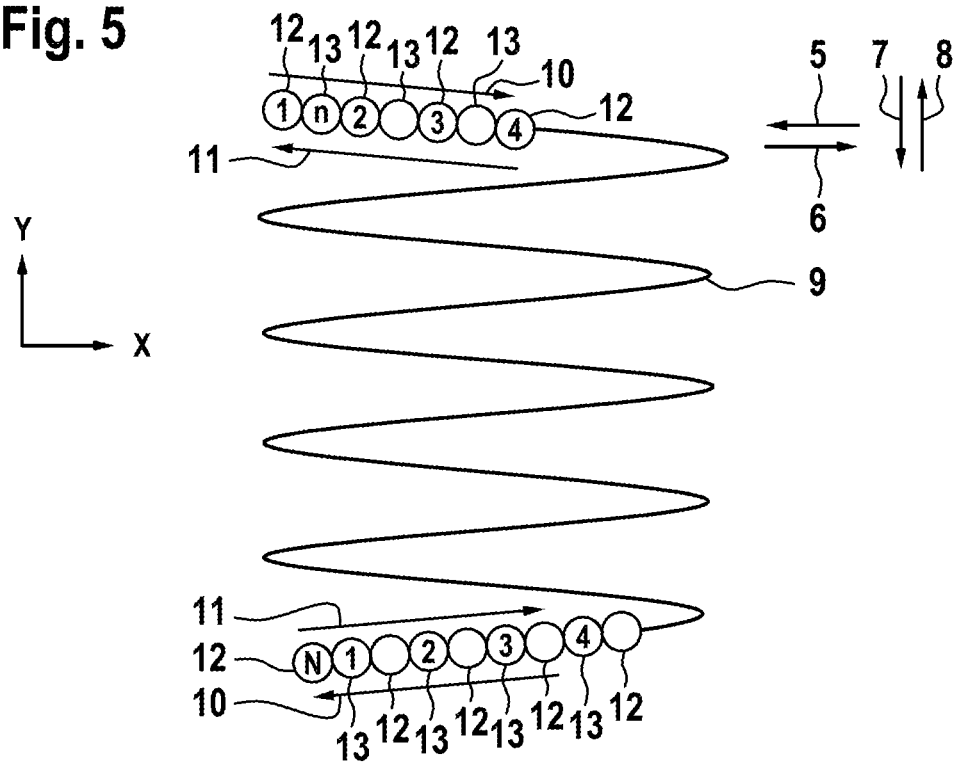
FIG. 5 shows a schematic view of a pulse pattern that is generatable during a first operating mode, using the LIDAR system according to the exemplary embodiment of the present invention.
Figure 6:
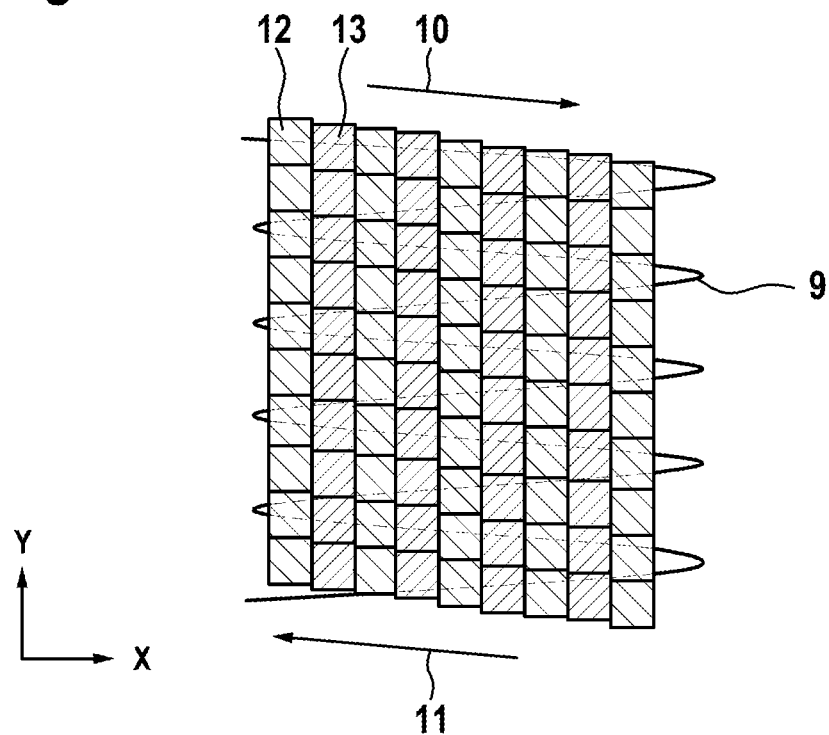
FIG. 6 shows a schematic view of a pixel-by-pixel coverage of a measuring surface via the scan pattern from FIG. 5.

FIGS. 5 and 6 show a first example of an operating mode of LIDAR system 1 according to the exemplary embodiment of the present invention. A scan pattern 9 in the form of a sinusoidal curve is achieved by superimposing partial movements 5, 6, 7, 8 described above, optical axis 100 being moved along this scan pattern 9 with a forward movement 10 and a backward movement 11. This is achieved in particular in that the oscillating movement in first spatial direction X has a higher frequency than the oscillating movement in second spatial direction Y.

The same scan pattern 9 is thus initially run through along forward movement 10, and subsequently along backward movement 11.

Control unit 4 is configured to emit light pulses via light source 3 at predefined locations of the scan pattern. These predefined positions are also referred to below as pixels 12, 13. Illuminating pixels 12, 13 in particular allows a two-dimensional measuring surface to be completely covered by LIDAR system 1.

To allow a preferably large spatial and temporal separation of the illumination of individual pixels 12, 13, it is provided that light pulses are emitted only at first pixels 12 during forward movement 10, while second pixels 13 are not illuminated. In contrast, during backward movement 11 second pixels 13 are illuminated, while first pixels 12 are not illuminated. First pixels 12 and second pixels 13 are situated in alternation along scan pattern 9, so that every other pixel is skipped over during the forward movement and the backward movement. As a result, on the one hand, all pixels 12, 13 that are present are illuminated, and, on the other hand, this illumination includes an enlarged temporal and spatial distance. The eye safety of LIDAR system 1 may be enhanced in this way.

Scan pattern 9 may be carried out either with a light source 2 that emits only a single light pulse, or with a light source 3 which includes subunits 2a, 2b described above and which may thus emit two light pulses. FIG. 5 schematically illustrates how only a single light pulse is emitted. FIG. 6 schematically illustrates how the two subunits 2a, 2b simultaneously emit light pulses for better coverage. While in FIG. 5 an illumination of pixels 12, 13 takes place during first partial movement 5 as well as during second partial movement 6, and in particular during simultaneous third partial movement 7 of first pixels 12 and during simultaneous fourth partial movement 8 of second pixels 13, when both subunits 2a, 2b are used as shown in FIG. 6, an illumination takes place only during first partial movement 5, but not during second partial movement 6. Since two pixels 12, 13 that are adjacent in second spatial direction Y are always illuminated during first partial movement 5, such an illumination is no longer necessary during second partial movement 6. In particular, a full-surface illumination of the measuring surface thus results, individual pixels 12, 13 being spatially and temporally illuminated at different points in time.

Figure 7:
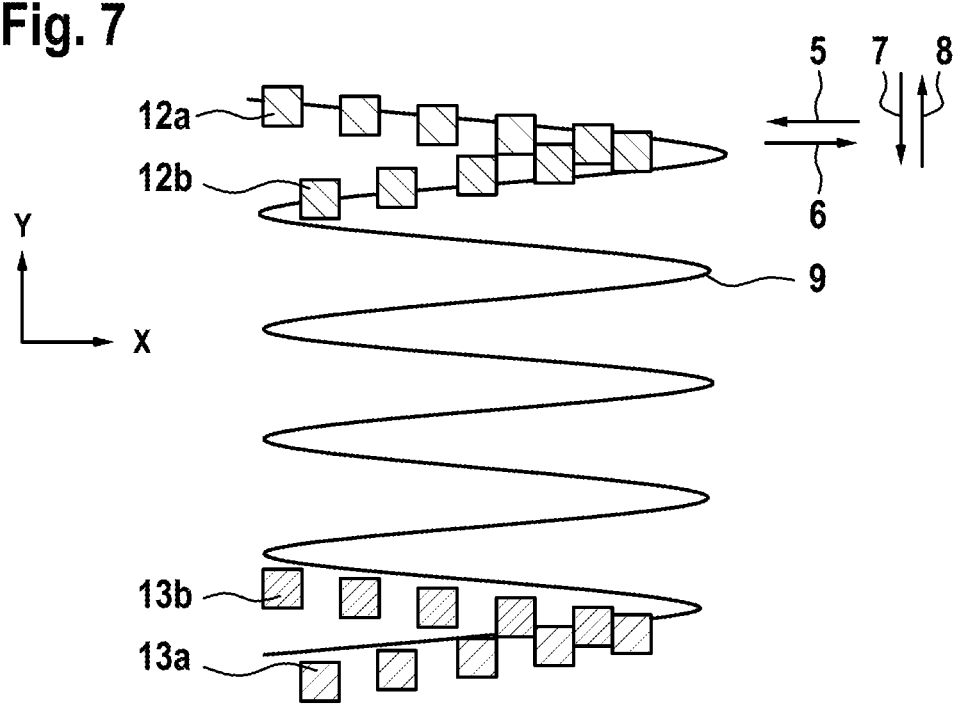
FIG. 7 shows a schematic view of a scan pattern that is generatable during a second operating mode, using the LIDAR system according to the exemplary embodiment of the present invention.
Figure 8:
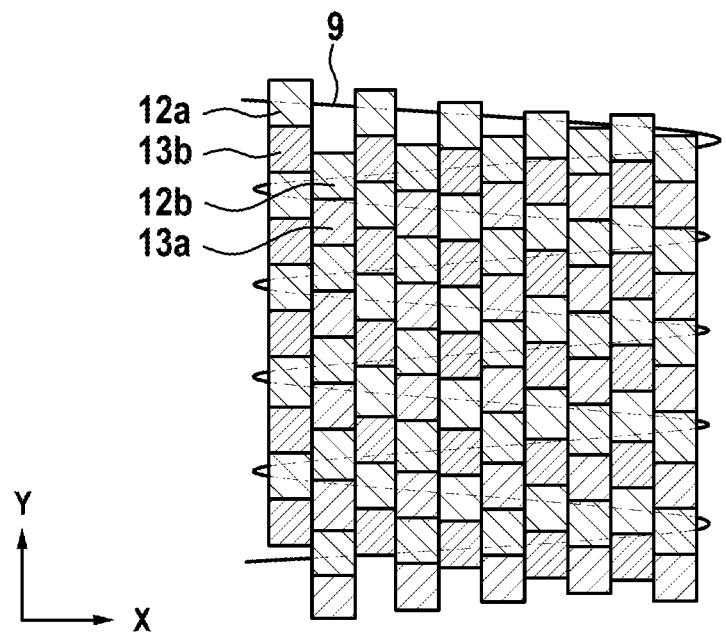
FIG. 8 shows a schematic view of a pixel-by-pixel coverage of a measuring surface via the scan pattern from FIG. 7.

FIGS. 7 and 8 show a second operating mode of LIDAR system 1 shown in FIG. 1. In this operating mode, it is provided that control unit 4 activates first subunit 2a and second subunit 2b of light source 2 independently of one another. It is thus provided that only first subunit 2a emits light pulses during the forward movement, once again this applying only to first pixels 12. Second subunit 2b remains completely inactive during forward movement 10. In contrast, only second subunit 2b of light source 2 is used to illuminate pixels 12, 13 during backward movement 11, only second pixels 13 being illuminated here, as described above. In addition, an illumination takes place during first partial movement 5 and also during second partial movement 6. Thus, FIG. 7 schematically shows that a first subgroup of first pixels 12a is illuminated during first partial movement 5, while during second partial movement 6 a second subgroup of first pixels 12b is illuminated when third partial movement 7 is simultaneously superimposed. In contrast, if second partial movement 8 is superimposed, the illumination of a first group of second pixels 13a takes place during first partial movement 5, while an illumination of a second group of second pixels 13b takes place during second partial movement 6. All these groups of pixels 12a, 12b, 13a, 13b have a nested configuration, and in their entirety completely cover the measuring surface to be detected. However, due to the various activation points in time of first subunit 2a and of second subunit 2b, a maximum temporal and spatial distance of the illuminations is present.

Figure 9:
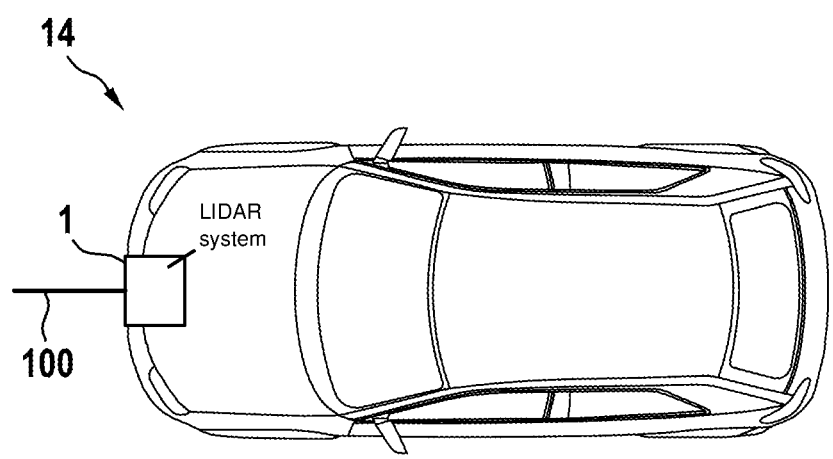
FIG. 9 shows a schematic view of a vehicle that includes a LIDAR system according to the exemplary embodiment of the present invention.

FIG. 9 shows a vehicle 14. Vehicle 14 includes a LIDAR system 1 according to the exemplary embodiment of the present invention. LIDAR system 1 may thus emit light pulses along a deflectable optical axis 100. Due to the operating modes described above, it is possible to improve the eye safety of LIDAR system 1.

What is claimed is:

1. A LIDAR system, comprising:
    at least one light source configured to emit a light pulse along an optical axis;
    at least one deflection device configured to deflect the light pulse along the optical axis in at least one first spatial direction and one second spatial direction; and
    a control unit configured to activate and deactivate the light source;
    wherein the deflection device is configured to deflect in an oscillating manner the light pulse along the optical axis in the first spatial direction and also in the second spatial direction, so that the light pulse along the optical axis repeatedly runs through a two-dimensional scan pattern, the oscillating deflection of the light pulse along the optical axis in the first spatial direction being achieved by repeated first partial movements and second partial movements opposite the first partial movements, and the oscillating deflection of the light pulse along the optical axis in the second spatial direction being achieved by repeated third partial movements and fourth partial movements opposite the third partial movements,
    wherein the control unit is configured to activate the light source to emit the light pulse in each case at predefined locations of the scan pattern, the predefined locations of the scan pattern being pixels, and the control unit is configured to activate the light source to emit the light pulse in each case at different pixels during the first partial movements and/or third partial movements than during the second partial movements and/or fourth partial movements,
    wherein the light source includes a first subunit and a second subunit, the first subunit and the second subunit being configured to illuminate two adjacent pixels independently of one another, and
    wherein the control unit is configured to activate the first subunit to emit light pulses only during the first partial movements and/or the third partial movements, and to activate the second subunit to emit light pulses only during the second partial movements and/or the fourth partial movements.

2. The LIDAR system as recited in claim 1, wherein the deflection device is configured to deflect the light pulse along the optical axis in a forward movement and in a backward movement along the scan pattern, the forward movement being a superimposition of multiple first partial movements and multiple second partial movements with an individual third partial movement, the backward movement being a superimposition of multiple first partial movements and multiple second partial movements with an individual fourth partial movement, and the control unit is configured to activate the light source to emit the light pulse, during the forward movement, only at first pixels and to skip over second pixels, and during the backward movement to activate the light source to emit the light pulse only at the second pixels and to skip over the first pixels.

3. The LIDAR system as recited in claim 2, wherein the first pixels and the second pixels are spatially situated directly adjacent to one another along the scan pattern.

4. The LIDAR system as recited in claim 1, wherein the control unit is configured to activate the light source to emit the light pulse, during the first partial movements and/or third partial movements, only at a first group of pixels, and during the second partial movements and/or fourth partial movements to activate the light source to emit the light pulse only at a second group of pixels, pixels of the first group and pixels of the second group being offset relative to one another, and being situated directly adjacent to one another.

5. The LIDAR system as recited in claim 1, wherein the deflection device includes a micromirror actuator.

6. The LIDAR system as recited in claim 5, wherein the deflection device includes an individual mirror that is tiltable about two different axes.

7. The LIDAR system as recited in claim 5, wherein the deflection device includes a first mirror and a second mirror, the light pulse along the optical axis being deflectable in the first spatial direction via the first mirror, and the light pulse along the optical axis being deflectable in the second spatial direction via the second mirror.

8. The LIDAR system as recited in claim 1, wherein the light source is a laser light source, and the light pulse is a laser pulse.

9. The LIDAR system as recited in claim 1, wherein all pixels are situated directly adjacent to one another, so that all pixels form a continuous two-dimensional measuring surface.

10. A vehicle including a LIDAR system, the LIDAR system comprising:
- at least one light source configured to emit a light pulse along an optical axis;
- at least one deflection device configured to deflect the light pulse along the optical axis in at least one first spatial direction and one second spatial direction; and
- a control unit configured to activate and deactivate the light source;
- wherein the deflection device is configured to deflect in an oscillating manner the light pulse along the optical axis in the first spatial direction and also in the second spatial direction, so that the light pulse along the optical axis repeatedly runs through a two-dimensional scan pattern, the oscillating deflection of the light pulse along the optical axis in the first spatial direction being achieved by repeated first partial movements and second partial movements opposite the first partial movements, and the oscillating deflection of the light pulse along the optical axis in the second spatial direction being achieved by repeated third partial movements and fourth partial movements opposite the third partial movements,
- wherein the control unit is configured to activate the light source to emit the light pulse in each case at predefined locations of the scan pattern, the predefined locations of the scan pattern being pixels, and the control unit is configured to activate the light source to emit the light pulse in each case at different pixels during the first partial movements and/or third partial movements than during the second partial movements and/or fourth partial movements,
- wherein the light source includes a first subunit and a second subunit, the first subunit and the second subunit being configured to illuminate two adjacent pixels independently of one another, and
- wherein the control unit is configured to activate the first subunit to emit light pulses only during the first partial movements and/or the third partial movements, and to activate the second subunit to emit light pulses only during the second partial movements and/or the fourth partial movements.

11. The vehicle as recited in claim 10, wherein the deflection device includes a micromirror actuator.

12. The vehicle as recited in claim 11, wherein the deflection device includes an individual mirror that is tiltable about two different axes.

13. The vehicle as recited in claim 11, wherein the deflection device includes a first mirror and a second mirror, the light pulse along the optical axis being deflectable in the first spatial direction via the first mirror, and the light pulse along the optical axis being deflectable in the second spatial direction via the second mirror.

14. The vehicle as recited in claim 10, wherein the light source is a laser light source, and the light pulse is a laser pulse.

15. The vehicle as recited in claim 10, wherein all pixels are situated directly adjacent to one another, so that all pixels form a continuous two-dimensional measuring surface.

* * * * *